(12) United States Patent
Fuchs

(10) Patent No.: US 6,383,644 B2
(45) Date of Patent: *May 7, 2002

(54) MULTI-LAYER SHEET COMPRISING A PROTECTIVE POLYURETHANE LAYER

(75) Inventor: Iris Fuchs, Willich (DE)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/395,823

(22) Filed: Sep. 14, 1999

(30) Foreign Application Priority Data

Nov. 11, 1998 (EP) .............................. 98203796

(51) Int. Cl.$^7$ ............................... B32B 27/40
(52) U.S. Cl. .................... 428/424.8; 428/332; 428/354; 428/423.1; 428/424.2; 428/424.7
(58) Field of Search .......................... 428/423.1, 424.2, 428/424.8, 332, 354, 424.7

(56) References Cited

U.S. PATENT DOCUMENTS

| RE24,906 E | 12/1960 | Ulrich ..................... 526/328.5 |
| 3,225,013 A | 12/1965 | Fram ........................... 528/332 |
| 3,331,729 A | 7/1967 | Danielson et al. ......... 428/40.4 |
| 4,083,824 A | * 4/1978 | Harris ....................... 260/42.9 |
| 4,301,053 A | * 11/1981 | Wolfrey ..................... 260/29.2 |
| 4,418,120 A | 11/1983 | Kealy et al. ................ 428/343 |
| 4,619,867 A | 10/1986 | Charbonneau et al. .................... 428/355 CU |
| 4,835,217 A | 5/1989 | Jorgensen et al. ............. 525/93 |
| 5,405,675 A | * 4/1995 | Saka et al. ................... 428/195 |
| 5,532,058 A | 7/1996 | Rolando et al. ............. 428/341 |
| 5,700,865 A | * 12/1997 | Lundquist .................. 524/506 |
| 5,972,148 A | * 10/1999 | Lukowski, Sr. ............. 156/184 |

FOREIGN PATENT DOCUMENTS

| EP | 0 416 765 A2 | 3/1991 |
| EP | 0 563 704 A1 | 10/1993 |
| GB | 1 549 458 | 8/1979 |
| GB | 1 549 459 | 8/1979 |
| WO | WO 87/00189 | 1/1987 |
| WO | WO 93/24551 | 12/1993 |
| WO | WO 94/13465 | 6/1994 |
| WO | WO 94/13496 | 6/1994 |

OTHER PUBLICATIONS

NeoRez R-986 Product data sheet, Nov. 1995.*

* cited by examiner

Primary Examiner—Blaine Copenheaver
Assistant Examiner—Christopher Paulraj
(74) Attorney, Agent, or Firm—Brian E. Szymanski; Harold C. Knecht, III

(57) ABSTRACT

The present invention provides a multilayer sheet comprising a polymeric film having on a first major side a cross-linked polyurethane layer, the major part of said cross-linked polyurethane layer comprising a polycarbonate based polyurethane containing acid groups and cross-linked with a cross-linker, the polycarbonate-based polyurethane comprising the reaction product of a polycarbonate polyol or a polycarbonate polyamine and an aliphatic polyisocyanate and the uncross-linked polycarbonate-based polyurethane having a Koenig hardness of at least 150 seconds.

13 Claims, No Drawings

MULTI-LAYER SHEET COMPRISING A PROTECTIVE POLYURETHANE LAYER

1. FIELD OF THE INVENTION

The present invention relates to a cross-linked polyurethane composition and a multilayer sheet comprising a polymeric film and a cross-linked polyurethane layer. The multilayer sheet can be used to protect a surface and can in particular be used to protect a car body. Accordingly, the present invention also relates to an automobile of which at least a part of the body is protected by the multilayer sheet. The invention also relates to a method for making the multilayer sheet.

2. BACKGROUND OF THE INVENTION

Polyurethane coatings are well known as protective coatings on various substrates to provide resistance to environmental weathering, chemical exposure, heat and abrasion. Polyurethanes are generally optically transparent and have found application in the protection of articles that have a variety of uses including both interior and exterior applications. Polyurethane coatings have further been used to cover and protect a base substrate having indicia or other decorative features thereon. Such decorative articles may have interior as well as exterior uses.

For example, WO 94/13465 describes a polyurethane based protective layer for protecting an embossed multilayer film. It is taught that a surface layer containing the reaction product of an aliphatic diisocyanate and a polyester polyol, polycarbonate polyol or polyacrylic polyol provides a good protection for interior as well as exterior uses. It is further disclosed that the polyurethane-based protective surface layer can be cross-linked or uncross-linked and can be solvent borne as well as aqueous borne.

WO 94/13496 discloses a multilayer graphic article that comprises a substrate, at least one color layer disposed thereon and a protective surface layer. The protective surface layer may comprise a polyurethane obtained from the reaction of an aromatic diisocyanate and a polyether polyol or a polyurethane obtained from the reaction of an aliphatic diisocyanate and a polyester polyol, polycarbonate polyol or polyacrylic polyol.

WO 93/24551 discloses that aqueous polyurethane dispersions can be used to produce a coating on various substrates. It is further mentioned that the they may be used for the provision of e.g. protective or decorative coatings since polyurethanes, depending on their composition, can possess many desirable properties such as good chemical resistance, water resistance, solvent resistance, toughness, abrasion resistance and durability. WO 93/24551 further discloses that polycarbonate polyol based polyurethanes can provide high performance aqueous polyurethane dispersions in terms of chemical, water, solvent and stain resistance of coatings derived therefrom. However such polycarbonate polyols are said to be expensive and the supply would not always be guaranteed.

Polyurethane protective coatings have been used on conformable films to protect parts of the body of an automobile. For example, the body of a car may need to be protected near the trunk where the body may be prone to damaging due to loading and unloading of articles. A fully satisfactory protective coating for this application has not yet been found despite the many protective coatings known in the art. Desirable properties for such a protective coating include good optical transparency, high weatherability, high heat resistance, high chemical resistance, high solvent resistance, high water resistance and high abrasion resistance. Furthermore, the protective coating desirably also has a good flexibility and can preferably be pigmented with dyes to obtain a colored protective layer without however substantially impairing the other desirable properties of the protective layer.

3. SUMMARY OF THE INVENTION

The present invention provides a multilayer sheet comprising a polymeric film having on a first major side a cross-linked polyurethane layer, the major part of said cross-linked polyurethane layer comprising a polycarbonate based polyurethane containing acid groups and cross-linked with a cross-linker, the polycarbonate based polyurethane comprising the reaction product of a polycarbonate polyol or a polycarbonate polyamine and an aliphatic polyisocyanate and the uncross-linked polycarbonate based polyurethane having a Koenig hardness of at least 150 seconds.

The multilayer sheet of the present invention has good abrasion and scratch resistance, high heat, solvent and weathering, resistance. Moreover, multilayer sheets with excellent optical properties such as clarity and transparency can be provided. Also, the polyurethane coating can be colored to provide colored versions of the multilayer sheets without substantially impairing the other desirable properties of the sheet. The multilayer sheets are useful in a variety of applications including both indoor as well as outdoor applications and they can be readily converted.

The present invention also provides a method of making a multilayer sheet comprising:

(i) coating a coating composition comprising a polycarbonate based polyurethane containing acid groups and a cross-linker on a major side of a polymeric film, and (ii) cross-linking the thus obtained coating, wherein the polycarbonate based polyurethane comprises the reaction product of a polycarbonate polyol or a polycarbonate polyamine and an aliphatic polyisocyanate and the uncross-linked polycarbonate based polyurethane having a Koenig hardness of at least 150 seconds.

The present invention further provides a cross-linked polyurethane composition comprising a polycarbonate based polyurethane containing acid groups and cross-linked with a cross-linker, the polycarbonate based polyurethane comprising the reaction product of a polycarbonate polyol or a polycarbonate polyamine and an aliphatic polyisocyanate and the cross-linked polycarbonate based polyurethane having a Koenig hardness of at least 150 seconds.

4. DETAILED DESCRIPTION OF THE INVENTION

The cross-linked polyurethane layer of the multilayer sheet of the present invention comprises a major amount of a cross-linked polycarbonate based polyurethane derived from the reaction of a polycarbonate polyol or a polycarbonate polyamine and an aliphatic polyisocyanate, preferably an aliphatic diisocyanate. The polycarbonate-based polyurethane further contains acid groups, preferably carboxylic acid groups, that provide the necessary cross-linking sites to the polyurethane. Preferably, the polycarbonate-based polyurethane has an acid number of at least 15 mg KOH/g and more preferably at least 18 mg KOH/g.

The polycarbonate-based polyurethane of the polyurethane layer should have a Koenig hardness of at least 150 seconds, preferably at least 175 seconds and more preferably at least 200 seconds. It has been found that if the polycarbonate-based polyurethane does not meet the Koenig hardness, the desired chemical and heat resistance as well as the desired abrasion resistance could not be achieved. It has further been found that other polyurethanes, e.g. polyester based polyurethanes, although meeting the Koenig hardness requirement of at least 150 seconds also fail to yield a protective layer that has the desired chemical and heat resistance as well as the desired abrasion resistance.

Although it is possible to blend the polycarbonate based polyurethane with other polyurethanes such as for example polyurethanes based on polyether or polyester polyols or polycarbonate based polyurethanes with a lower Koenig hardness than 150 seconds, the cross-linked polycarbonate based polyurethane should form the major part of the polyurethane layer. In accordance with the present invention, "major part" means at least 60% by weight. Preferably, the cross-linked polycarbonate polyurethane constitutes at least 80% by weight and more preferably at least 90% by weight of the total weight of the polyurethane layer. The best results can be achieved when the cross-linked polycarbonate based polyurethane constitutes about 100% by weight of the polyurethane layer.

The polycarbonate-based polyurethane is preferably an aqueous borne dispersion. Aqueous borne dispersions of polycarbonate based polyurethanes and their method of preparation are well-known in the art and has been described in for example GB1549458 and GB1549459. Polycarbonate based polyurethanes for use in connection with the present invention are commercially available and include for example NEOREZ™ R-986 and NEOREZ™ R-985 available from Zeneca Resins, Frankfurt, Germany and ALBERDINGK™ U 911 available from Aberdingk-Boley GmbH, Krefeld, Germany.

The polycarbonate-based polyurethane is cross-linked with a suitable cross-linker that readily reacts with the acid groups of the polycarbonate-based polyurethane. Preferably, the cross-linker allows for curing at a temperature below 100° C. Cross-linking at low temperature is particularly desirable when the polymeric film of the multilayer-layer sheet has a low softening point. Examples of cross-linkers that can be used to cross-link the polycarbonate based polyurethane include melamines such as e.g. Cymel™ 303, Cymel™ 373 available from Cyanamide company, ureas, benzoguanamines such as Cymel™ 1123 glycolurils such as Cymel™ 1172 and multifunctional carbodiimides such as UCARLINK™ XL 29 SE available from Eurochem. A particularly preferred class of cross-linkers for use in this invention are the polyfunctional aziridines. Examples of suitable polyfunctional aziridines include those disclosed in U.S. Pat. No. 3,225,013. Preferably, the polyfunctional aziridine is a trifunctional aziridine. Particular examples are trimethylol propane tris[3-aziridinyl propionate]; trimethylol propane tris[3(2-methyl-aziridinyl)-propionate]; trimethylol propane tris[2-aziridinyl butyrate]; tris(1-aziridinyl) phosphine oxide; tris(2-methyl-1-aziridinyl)phosphine oxide; pentaerythritol tris-3-(1-aziridinyl propionate); and pentaerythritol tetrakis-3-(1-aziridinyl propionate). Commercially available polyfunctional aziridines include those available under the trade designations "XAMA-2" (trimethylolpropane-tris-(.beta.-(N-aziridinyl)propionate) and "XAMA-7" (pentaerythritol-tris-(.beta.-(N-aziridinyl) propionate) from B.F. Goodrich Chemical Co., Cleveland, Ohio, and "NeoCryl CX-100" from Zeneca Resins, Wilmington, Mass.

The cross-linker will generally be used in an amount of 5 parts by weight to 15 parts by weight for 100 parts by weight of the polycarbonate-based polyurethane.

The polyurethane layer may contain further components conventionally employed in protective coatings such as for example an anti-oxidant or an Ultraviolet radiation stabilizer. Further, the polyurethane layer of the present invention can be pigmented if a particular tinting of the multilayer-layer sheet is desired. Although the addition of inorganic or organic pigments somewhat reduces the excellent properties of the polyurethane layer, they can be added to the polyurethane layer while still achieving a good and useful weatherability, chemical and heat resistance as well as a good abrasion and scratch resistance. Particularly preferred coloring pigments are dye pigments and most preferably aqueous borne dye pigments. Dye pigments suitable for the addition to the polyurethane layer may be in the form of a paste that comprises the dye pigment mixed with a water soluble or water dispersible binder. Commercially available dye pigments that can be used in the polyurethane layer of this invention include Isoversal™ WL available from ISL Chemie GmbH and the dye pigments available from BASF under the trade name Luconyl™. Typically, dye pigments can be added to the polyurethane layer in an amount of 0,5 phr (parts per hundred) up to 10 phr without reducing the beneficial properties of the polyurethane layer to an unacceptable level.

A cross-linked polyurethane layer of the present invention typically has an E-modulus (also known as Young modulus) of at least 750 N/mm$^2$, a tensile strength at break between 22 and 44 N/mm$^2$ and an elongation at break of 30 to 140%.

The polyurethane layer of the present invention is provided on a polymeric film to obtain the multilayer sheet of the present invention. Polymeric films on which the polyurethane layer can be provided include polyurethane films, polyester films and polyolefin films such as polypropylene film, polyethylene films and films formed from blends of polyethylene and polypropylene, films formed from ethylene modified copolymers such as ethylene-vinylacetate, ethylene-(meth)acrylic acid, ethylene-methacrylate and blends of these materials. Polymeric films with particularly desirable properties for use in a multilayer sheet to protect the body of an automobile include the ionomers of olefin/vinyl carboxylate copolymers such as ethylene-acrylic acid and ethylene-methacrylic acid copolymers combined with various metal cations including cations of lithium, sodium, potassium, zinc, aluminum and calcium. Suitable commercial ionomer resins include the Surlyn™ family of materials available from E.I. DuPont de Nemours & Co.

Polymeric films formed from ionomers of olefin/vinyl carboxylate copolymers have excellent optical characteristics, high flexibility, good heat resistance and desired shrinkage behavior. Combined with the polyurethane layer of this invention, a multilayer sheet results that has excellent protective properties for use in exterior applications.

In a preferred embodiment in connection with the present invention, the multilayer sheet further comprises an adhesive layer on the major side of the polymeric film opposite to the major side of the polymeric film carrying the polyurethane layer. The adhesive layer is generally protected by a conventional release liner. A suitable adhesive layer for use in this embodiment preferably includes a normally tacky pressure sensitive adhesive. The latter is being preferred in the present invention. Particularly suitable pressure sensitive adhesives are, for example, based on polyacrylates, synthetic and natural rubbers, polybutadiene and copolymers or polyisoprenes and copolymers. Silicone based adhesives such as polydimethylsiloxane and polymethylphenylsiloxane may also be used. Particularly preferred pressure sensitive adhesives for use in this invention are polyacrylate based adhesives because they provide such properties as high clarity, UV-stability and aging resistance. Polyacrylate adhesives that can be used in this invention include, for example, those described in U.S. Pat. No. 4,418,120; U.S. Pat. No. Re 24,906 (Ulrich), U.S. Pat. No. 4,619,867; U.S. Pat. No. 4,835,217 and WO 87/00189. Preferably, the polyacrylate pressure sensitive adhesive comprises a crosslinked copolymer of a $C_4$–$C_{12}$ alkylacrylate and an acrylic acid. The polyacrylate pressure sensitive adhesive preferably also comprises a tackifier such as rosin ester. Adhesives useful in the invention may incorporate additives such as ground glass, titanium dioxide, silica, glass beads, waxes, tackifiers, low molecular weight thermoplastics, oligomeric species, plasticizers, pigments, metallic flakes and metallic powders as long as they are provided in an amount that does not materially adversely effect the adhesive bond to the surface. Generally, the adhesive layer is provided at a thickness of 25 to 560 microns. For certain applications, such as applying the multilayer sheet to a car body, it is often desirable that the adhesive has an initial repositionability so that the sheet can be adjusted to fit at a desired place before a permanent bond is formed. Typically, such repositionability may be achieved by providing a layer of minute glass bubbles on the adhesive surface as disclosed in U.S. Pat. No. 3,331,729.

The multilayer sheet of the present invention can be obtained by coating a coating composition comprising the polycarbonate-based polyurethane on a major side of the polymeric film. Prior to coating, the polymeric film is preferably corona treated or alternatively, one or more primer layers may be provided on the polymeric film to assure good coatability and adherence of the polyurethane layer to the polymeric film. It is furthermore desirable to coat the polycarbonate-based polyurethane from an aqueous borne dispersion. By the term "aqueous borne" is meant that the major part of the fluid phase of the dispersion consists of water. The fluid phase may further contain organic solvents, in particular water miscible solvents. Preferably, the fluid phase of the dispersion will contain at least 60% by weight and more preferably at least 80% by weight of water. The coating composition further contains the cross-linker and any other optional compounds such as dye pigments. The total amount of solids of the coating composition will typically vary between 25% by weight and 50% by weight. In connection with a preferred embodiment of the present invention, at least 80% by weight and more preferably between 90% by weight and 100% by weight of the solids will be formed by the polycarbonate-based polyurethane and the cross-linker. The coating composition will generally be applied in an amount sufficient to obtain a dried thickness of 5 to 15 microns.

Any conventional coating technique may be employed for coating the polyurethane coating composition on the polymeric film. Examples of useful coating techniques include meyer bar coating, spray coating, screen printing, rotary screen coating, as well as gravure coating such as direct (forward) gravure coating, reverse gravure coating and offset gravure coating.

Cross-linking of the coated polyurethane coating composition will generally be achieved by heating. Heating may be accomplished by supplying direct heat or indirectly for example by infrared radiation. Typically, the coating is heated to a temperature of 50° C. to 140° C., preferably 90° C. to 125° C. for 20 seconds to 5 minutes and preferably 20 seconds to 60 seconds to obtain a sufficient level of crosslinking of the polyurethane layer.

In accordance with a preferred embodiment in connection with the present invention, the opposite side of the polymeric film can be coated with an adhesive coating composition to provide an adhesive layer to the polymeric film. The adhesive coating composition may be solventless, solvent based or water based. As an alternative to coating, the adhesive layer may be laminated to the polymeric film. The adhesive layer may be provided after coating of the polyurethane coating composition to the polymeric film or prior to coating of the polyurethane coating composition.

The invention is further illustrated by means of the following examples without however the intention to limit the invention thereto.

EXAMPLES

The following test methods are used in the examples:
Hoffman Scratch Resistance Test Scratch and mar resistance were measured by a Balanced-Beam Scrape tester described in ASTM (American Society of Testing Materials) -2197-86- The Hoffman stylus was held at 45 degrees from the vertical, the top sloping in the direction of the test sample travel, and was held in place by a fulcrum elevated at 22 degrees. Weights of 75 g, 100 g and 250 g, respectively, were placed on the weight support, the beam was lowered until the loop rested on top of the test specimen, following which the sliding platform was slowly pushed across the specimen. The scratch tests were performed at 25° C.

The films were evaluated visually and given the ratings:

•=pass (No permanent damage/mar/mark on the top coat)

•*=pass (the mar on the top coat recovered)

+=fail (permanent damage/mar/mark on the top coat)

Tensile, Elongation and E-modulus

Films of the polyurethanes with crosslinker were prepared by knife coating the mixtures at a wet thickness of ca. 140 microns onto a release-coated paper, drying for 5 min. at 23° C. and then curing in a forced air oven at 95° C. for 3 minutes to give cured films having a thickness of between 25 and 50 microns.

Tensile and elongation measurements were then made according to DIN 53455 using a commercially available tensile tester available as Model 1446 from Zwick GMbH (Ulm, Germany). The jaws of the tensile tester were moved apart at 300 mm/min. The samples used for tensile and elongation measurements were 100 mm length×25.4 mm in width. The thickness of the film was measured with a spring micrometer and used in the calculations.

E-Modulus measurements were made according to DIN (Deutsche Industrie Norm) 53457 using the same tensile tester as described above. The jaws of the tensile tester were moved apart at a rate of 1 mm/min. E-Modulus measurement range was between 0.05–0.25%. The test samples used for measurement of E-modulus were 100 mm in length and 25.4 mm in width.

Heat Resistance

Samples of adhesive-coated (bottom side) and polyurethane-coated (top side) films were adhered to an aluminum plate and then stored first for 24 h under at 23° C. They were then placed in a forced air oven for two days at 120° C. The test plates bearing adhered films were removed from the oven, allowed to cool and evaluated visually for signs of yellowing.

The visual ratings were:

•=pass (no yellowing),

+=fail (yellowing)

Solvent Resistance Test

Applied samples of adhesive-coated films were mounted in an American Association of Textile Chemists and Colorists (A.A.T.C.C.) crockmeter, commercially available as Model CM5, from Atlas Electric Devices Co (Chicago, Ill., USA). The rub test was done according to A.A.T.C.C. test method 8—1972.

The test fluids used were methyl isobutylketone (MIBK) and "FAM (type B)" test fuel described in the Test Method DIN (Deutsche Industrie Norm) 51604 B.

2×5 inch samples of the adhesive-coated films having cured polyurethane top coats were adhered to an aluminum panel, the panel was mounted into the A.A.T.C.C. crockmeter. Cotton wool was used as rub cloth, which was soaked with the test fluid. The sample surface was rubbed with solvent-soaked cotton pad for a total of 50 cycles.

The solvent resistance was rated visually with the following meanings:

• = pass (no rub trace),

+ = fail (rub trace/rub off)

Koenig Hardness

The value for Koenig Hardness (measured according to DIN (Deutsche Industrie Norm) 53157) of the uncrosslinked dried polyurethane films was taken from the product literature of the polyurethane suppliers.

Acid Number

Acid number of polyurethanes employed in the coating compositions was measured according to DIN (Deutsche Industrie Norm) 53402 and recorded in mg KOH per g of solid polymer.

Example 1

A 250 micron thick film of ethylene- methacrylic acid copolymer ionomer with Zn-cations (an ionomer) (available as SURLYN (TM)-1705-1 from DuPont) was extruded using conventional methods. The composition used to extrude the ionomer film included an ultraviolet radiation stabilization package similar to that recommended by the polymer resin manufacturer and comprising a pair of ultraviolet radiation absorbers, a hindered amine light stabilizer and an antioxidant.

The resulting ionomer film was then corona discharge treated on one side at a net power of 500 Joules/second with a line speed of 18 cm/second.

The corona-treated side of the film was then laminated to a 33 micron thick layer of acrylate pressure-sensitive adhesive supported on a polyethylene-coated paper liner bearing a silicone release layer on the polyethylene coating.

The second side of the Surlyn (TM) film was then corona discharge treated using the same conditions as above.

A coating composition was then prepared from 100 parts by weight of water-based polyurethane resin made from a polycarbonate diol and an aliphatic diisocyanate (35% solids, available as NeoRez (TM) R-986 from Zeneca Resins, Frankfurt, Germany) and 3.5 parts by weight of a polyfunctional aziridine crosslinker (available as NeoCryl (TM) CX-100 from Zeneca Resins, Frankfurt, Germany) by mixing the two components in an open container using a motorized propeller stirrer for five minutes at 23° C.

The polyurethane type employed in the PU coating composition for Example 1 is shown in Table 1 below. The content of the coating composition, including the polyurethane and crosslinker, is summarized in Table 2.

The composition thus prepared was then coated onto the non-adhesive, corona-treated side of the film using a coating rod to give a wet coating thickness of 18.3 µm (0.72 mils). The polyurethane coating was allowed to dry for 15 sec at 23° C. and then cured in a forced air oven at a temperature of 90° C. for 30 sec.

The protective film thus prepared was stored at 23° C. and 50% relative humidity for 72 hrs before testing.

The tests outlined under Test Methods above were performed and the results recorded in Tables 3 and 4. Table 3 shows the tensile and elongation properties as well as the E-modulus of the self-supported polyurethane films, independent of any substrate. Table 4 shows the Hoffman Scratch Resistance and the Heat/Solvent Resistance of the polyurethane-coated films of the Examples.

The resulting adhesive-coated sheet was clear, virtually colorless and free of surface defects.

The protective release liner was removed from the pressure-sensitive adhesive layer and the sheet was applied to the painted bumper of an automobile using a hand-held plastic applicator (commonly referred to as a squeegie, commercially available at RHEO PLASTICS, Minnesota, USA) designed for adhering adhesive-coated films to smooth substrates. The sheet conformed well to the bumper, could be applied in a bubble-free manner and was not scratched during the application process.

The color of the painted bumper was clearly visible through the protective film and the sheet itself was difficult to detect visually.

Examples 2–3

Examples 2–3 were prepared in the same manner as Example 1, with the exception that two other polycarbonate-based waterborne polyurethanes were employed in the coating compositions, respectively.

Example 2 used NeoRez™ R-985 from Zeneca Resins as the polyurethane component of the coating composition and Example 3 employed a third polycarbonate-based polyurethane (available as Alberdingk U 911 from Alberdingk-Boley GmbK 47829, Krefeld, Germany).

Composition of the polyurethane coatings as well as the properties of resulting films are summarized in Tables 1–4.

Comparative Examples 1–7

Comparative Examples 1–7 were prepared in the same manner as Example 1. Each Comparative Example employed a different waterborne polyurethane polymer as summarized in Table 1.

Comparative Examples 1–6 show that polyurethanes based on polyether and polyester diol segments cannot pass the Scratch Resistance Test.

Comparative Example 7 shows a polycarbonate-based polyurethane (having a low Koenig Hardness of only 80) that cannot pass the Scratch Resistance Test.

Composition of the polyurethane coatings as well as the properties of resulting films are summarized in Tables 1–4.

Example 8

Example 1 was repeated with the exception that the polyurethane coating composition comprised 30.00 parts by weight polycarbonate-based polyurethane (available as Neorez 986 from Zeneca Resins), 1.05 parts by weight polyaziridine crosslinker (available as Neocryl CX 100 from Zeneca Resins) and additionally 1.17 parts by weight of a red pigment paste (available as WL 00894/3174 from ISL Chemie GmbH, 51515 Kuerten, Germany).

The coating composition was applied to a film and cured as in Example 1. An aesthetically attractive red film was obtained which had physical properties almost identical to Example 1.

The red film was applied to a painted bumper of an automobile having the same red color. The protective sheet was difficult to see after application to the substrate.

TABLE 1

| PUs | Diol Type | PU Trade name | Acid Number (mg KOH/g) | Koenig Hardness (sec) |
|---|---|---|---|---|
| 1 | PC | NeoRez ™ R-986 | 21.5 | 200 |
| 2 | PC | NeoRez ™ R-985 | 20.5 | 220 |
| 3 | PC | Alberdingk ™ U 911 | 18.9 | 150 |
| C1 | PE | NeoRez ™ R-960 | 30.0 | 130 |
| C2 | PH | NeoRez ™ R-970 | 16.0 | 30 |
| C3 | PE | NeoRez ™ R-981 | 29.0 | 115 |
| C4 | PE | Alberdingk ™ U 325 | 14.4 | 30 |
| C5 | PE | Alberdingk ™ U 610 | 19.8 | 50 |
| C6 | PE | Alberdingk ™ U 910 | 17.5 | 155 |
| C7 | PC | Alberdingk ™ U 615 | 23.4 | 80 |

PC = polycarbonate
PE = polyester
PH = polyether
PU = polyurethane

TABLE 2

| PU coating Composition | Polyurethane Resin Dispersion (parts by weight) | Aziridine Crosslinker Dispersion (NeoCryl CX 100) (parts by weight) |
|---|---|---|
| 1 | 100 | 3.5 |
| 2 | 100 | 3.5 |
| 3 | 100 | 3.0 |
| C1 | 100 | 3.4 |
| C2 | 100 | 3.9 |
| C3 | 100 | 3.2 |
| C4 | 100 | 4.0 |
| C5 | 100 | 3.0 |
| C6 | 100 | 3.0 |
| C7 | 100 | 3.9 |

TABLE 3

Properties of unsupported films of dried polyurethanes

| Cured PU Films | E-modulus (N/mm$^2$) | Tensile strength at break (N/mm$^2$) | Elongation at break (%) |
|---|---|---|---|
| 1 | 773.2 | 37.4 | 113.0 |
| 2 | 924.1 | 37.1 | 51.0 |
| 3 | 828.3 | 25.7 | 49.5 |
| C1 | 600.8 | 33.7 | 100.0 |
| C2 | 37.6 | 11.8 | 181.0 |
| C3 | 516.8 | 31.8 | 150.0 |
| C4 | <5.0 | 19.2 | 246.0 |
| C5 | 90.7 | 22.0 | 107.0 |
| C6 | 754.7 | 24.9 | 61.0 |
| C7 | 159.9 | 31.9 | 213.0 |

TABLE 4

Properties of Cured PU-coated films of the invention

| | Hoffmann Scratch Resistance (weight of load) | | | Heat and Solvent Resistance | | |
|---|---|---|---|---|---|---|
| Example | 75 grams | 100 grams | 250 grams | Heat | Test Fuel FAM B | MIBK |
| 1 | • | • | • | • | • | • |
| 2 | • | • | • | • | • | • |
| 3 | • | •* | + | • | • | • |
| C1 | + | + | + | + | • | • |
| C2 | + | + | + | + | + | • |
| C3 | + | + | + | • | • | • |
| C4 | + | + | + | + | + | • |
| C5 | + | + | + | + | • | • |
| C6 | + | + | + | + | • | • |
| C7 | + | + | + | + | • | • |

Hoffmann Scratch Resistance
• = pass (No permanent damage/mar/mark on the top coat)
•* = pass (The mark on the top coat recovered)
+ = fail (Permanent damage/mark on the top coat)
Heat Resistance
• = pass (no yellowing)
+ = fail (yellowing)
Solvent Resistance
• = pass (no rub trace)
+ = fail (rub trace/rub off)

What is claimed is:

1. Multilayer sheet comprising a polymeric film having on a first major side a cross-linked polyurethane layer having an E-modulus of at least 750 N/mm$^2$, a tensile strength at break between 22 and 44 N/mm$^2$ and an elongation at break of 30 to 140%, the major part of said cross-linked polyurethane layer comprising a polycarbonate based polyurethane containing acid groups and cross-linked with a crosslinker, the polycarbonate based polyurethane comprising the reaction product of a polycarbonate polyol or a polycarbonate polyamine and an aliphatic polyisocyanate and the polycarbonate based polyurethane, when not cross-linked with said crosslinker, having a Koenig hardness of at least 150 seconds, said sheet being sized and shaped to conform to a surface of an automobile.

2. Multilayer sheet according to claim 1 wherein said polymeric film is formed from an olefinic polymer.

3. Multilayer sheet according to claim 2 wherein said polymeric film is formed from an ionomer of an olefin-vinyl carboxylic acid copolymer.

4. Multilayer sheet according to claim 3 wherein said ionomer is an ionomer of an ethylene/acrylic acid copolymer or an ethylene/methacrylic acid copolymer.

5. Multilayer sheet according to claim 1 wherein said polymeric film comprises on the second major side opposite to the first major side an adhesive layer.

6. Multilayer sheet according to claim 5 wherein said adhesive layer comprises a normally tacky pressure sensitive adhesive.

7. Multilayer sheet according to claim 5 wherein said adhesive layer is protected by a release liner.

8. Multilayer sheet according to claim 1 wherein said cross-linker is a polyfunctional aziridine.

9. Multilayer sheet according to claim 1 wherein said cross-linked polyurethane layer comprises 90% to 100% by weight of the total weight of the cross-linked polyurethane layer of said polycarbonate based polyurethane cross-linked with a cross-linker.

10. Multilayer sheet according to claim 1 wherein the polycarbonate based polyurethane has an acid number of at least 15 mg KOH/g.

11. Multilayer sheet according to claim 1 wherein said sheet is affixed to a surface of an automobile.

12. Multilayer sheet according to claim 1 wherein said sheet is in contact with a surface of an automobile.

13. A method of using the multilayer sheet of claim 1 to protect a surface of an automobile, comprising applying the multilayer sheet to said surface of the automobile.

* * * * *